Figure 5:
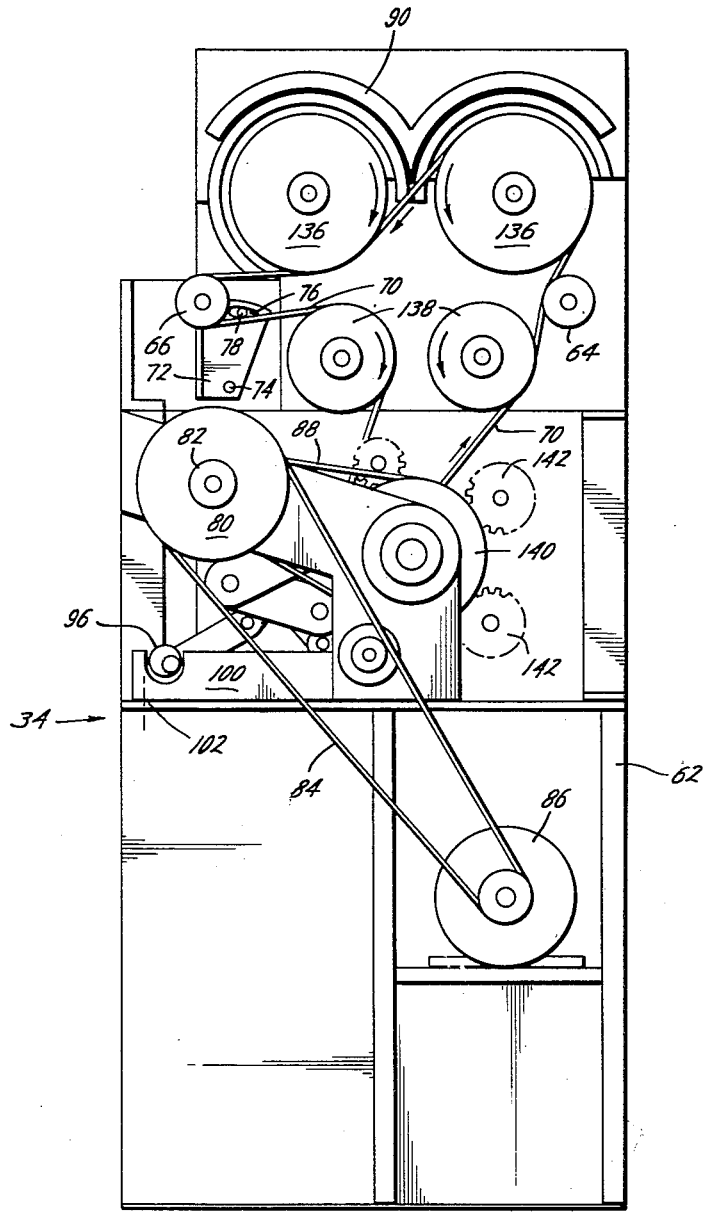

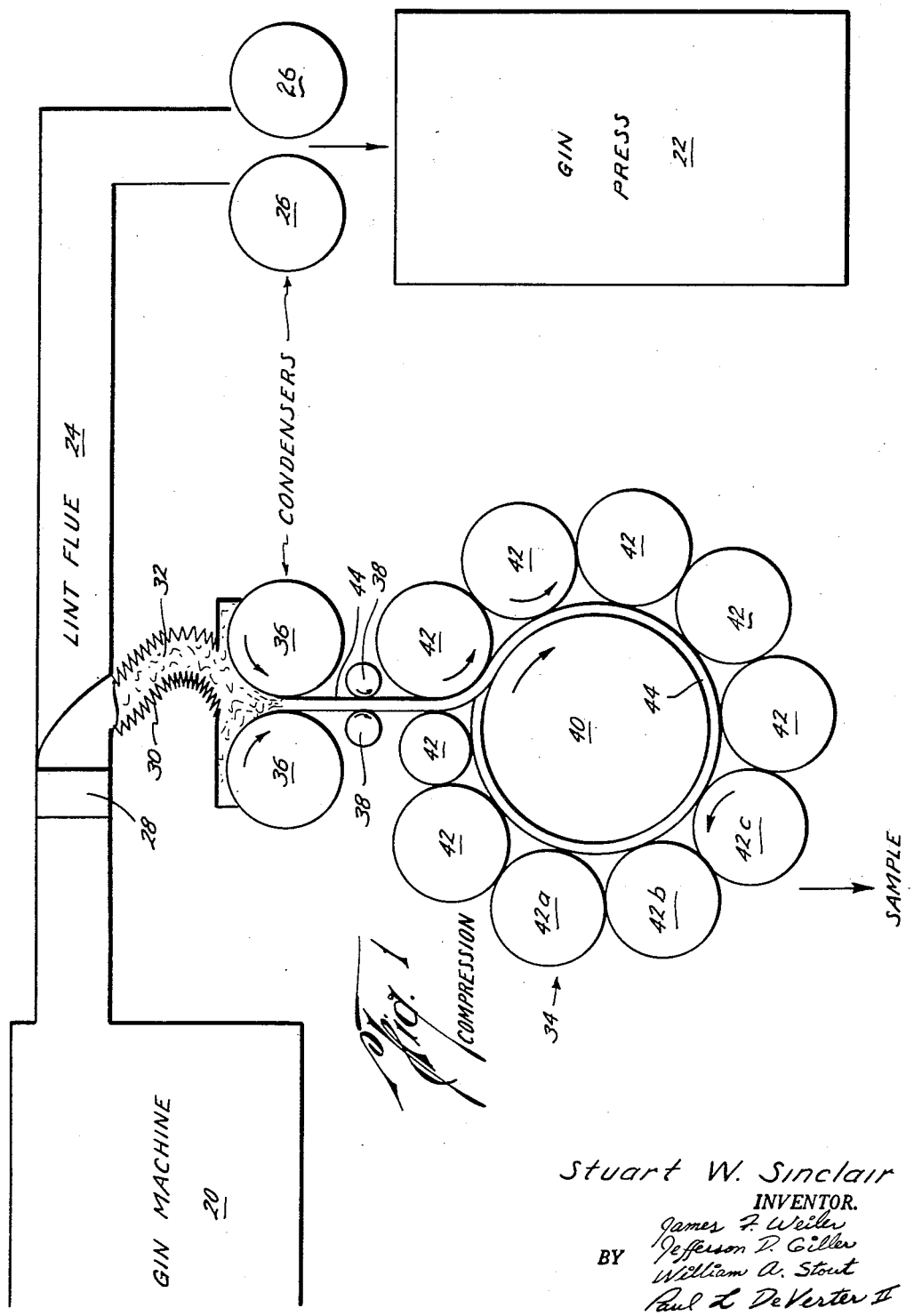

Feb. 25, 1964 S. W. SINCLAIR 3,122,089
ROTARY PRESS AND LINT SAMPLER
Filed May 16, 1961 8 Sheets-Sheet 2
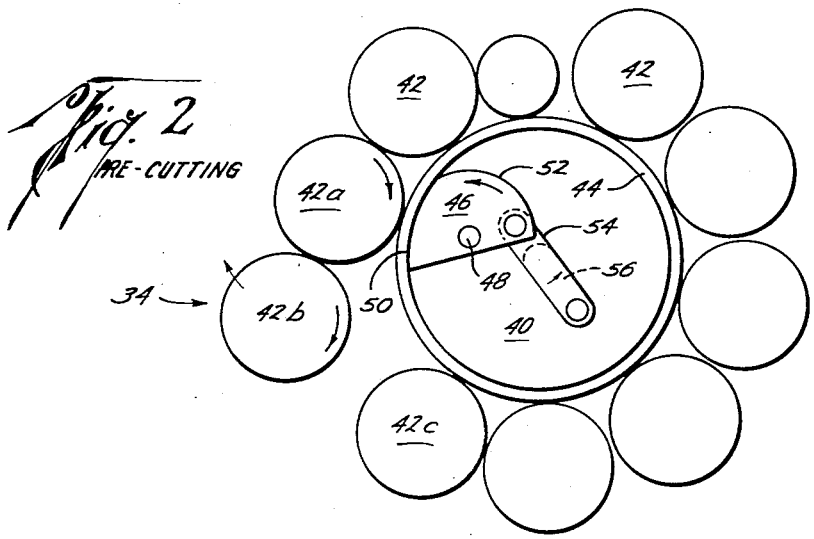
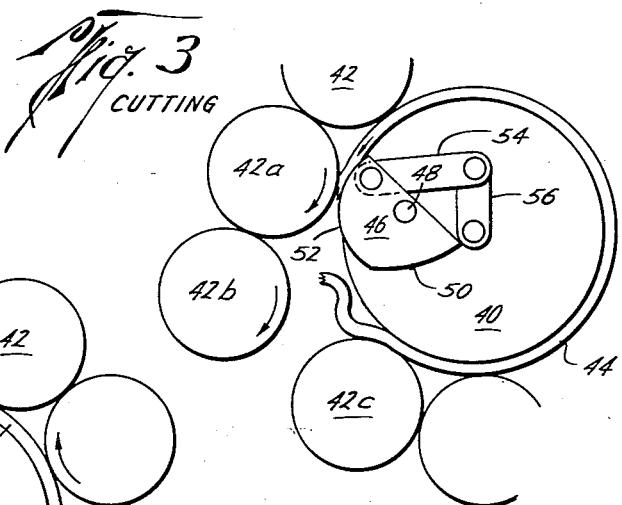
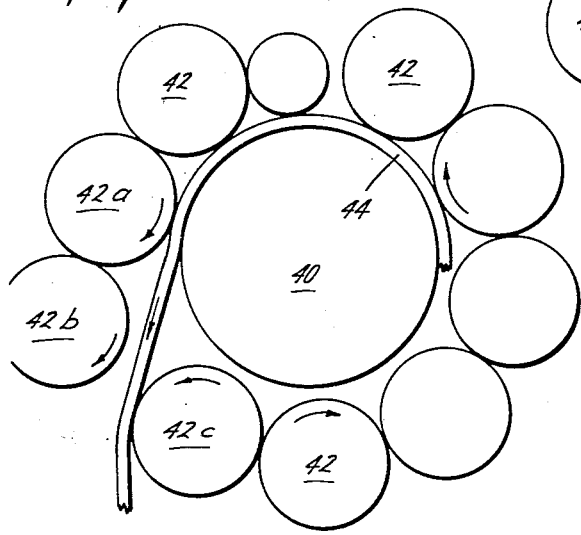
Stuart W. Sinclair
INVENTOR.
BY James F. Weiler
Jefferson D. Giller
William A. Stout
Paul L. DeVerter II
ATTORNEYS Feb. 25, 1964   S. W. SINCLAIR   3,122,089
ROTARY PRESS AND LINT SAMPLER
Filed May 16, 1961   8 Sheets-Sheet 3

Stuart W. Sinclair
INVENTOR.

BY James F. Weiler
Jefferson D. Giller
William A. Stout
Paul L. DeVerter II
ATTORNEYS

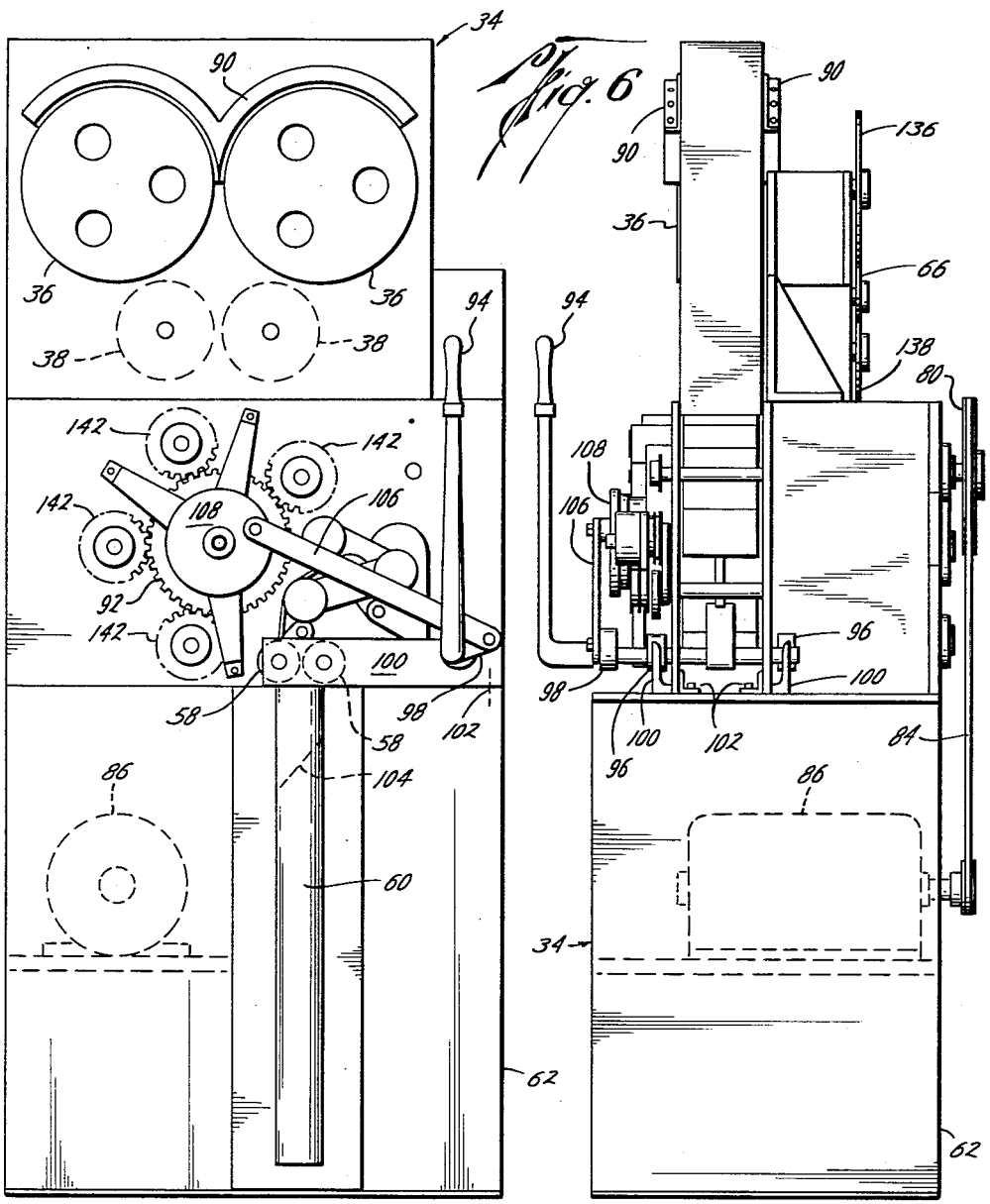

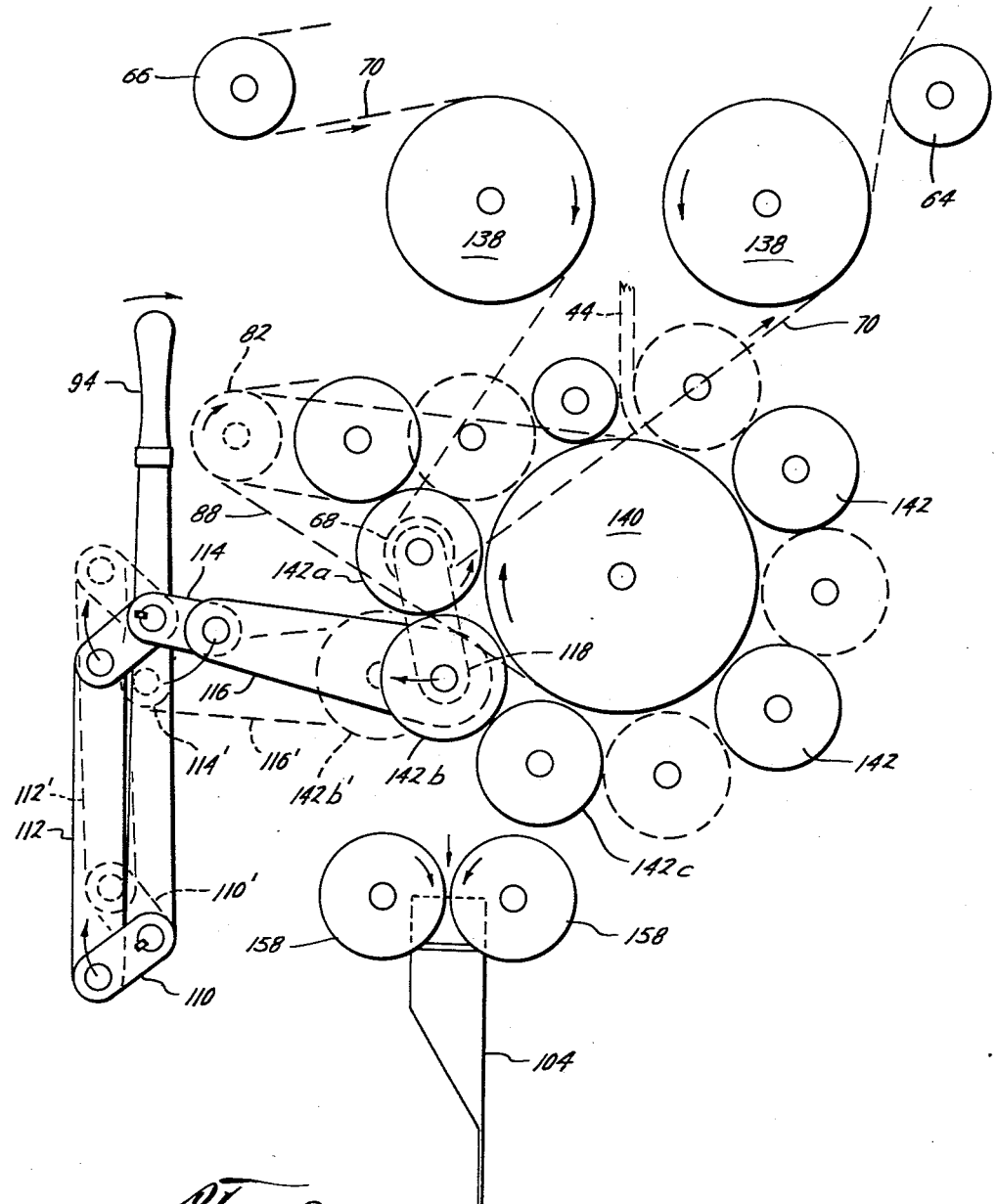

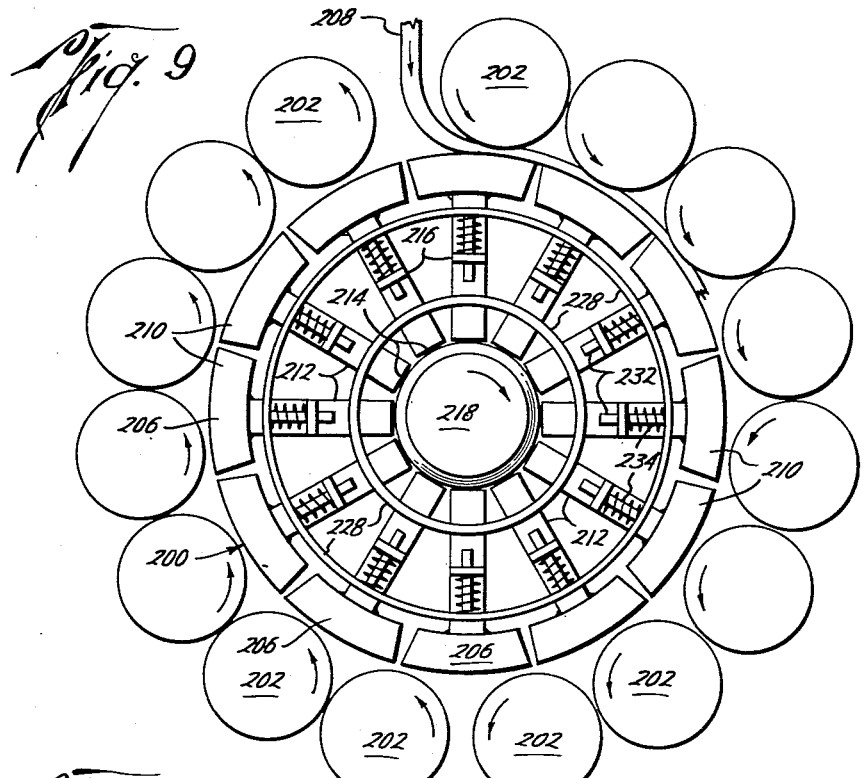
Fig. 9
Fig. 10 COMPRESSION
Fig. 11 WITHDRAWAL
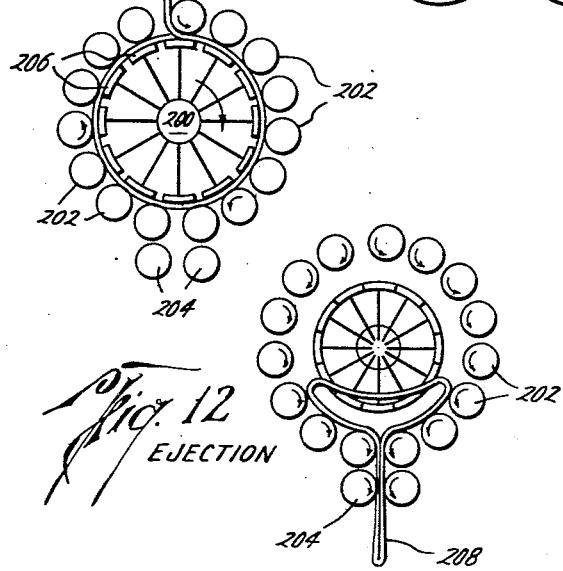
Fig. 12 EJECTION
Stuart W. Sinclair
INVENTOR.
BY James F. Weiler
Jefferson D. Giller
William A. Stout
Paul L. DeVerter II
ATTORNEYS

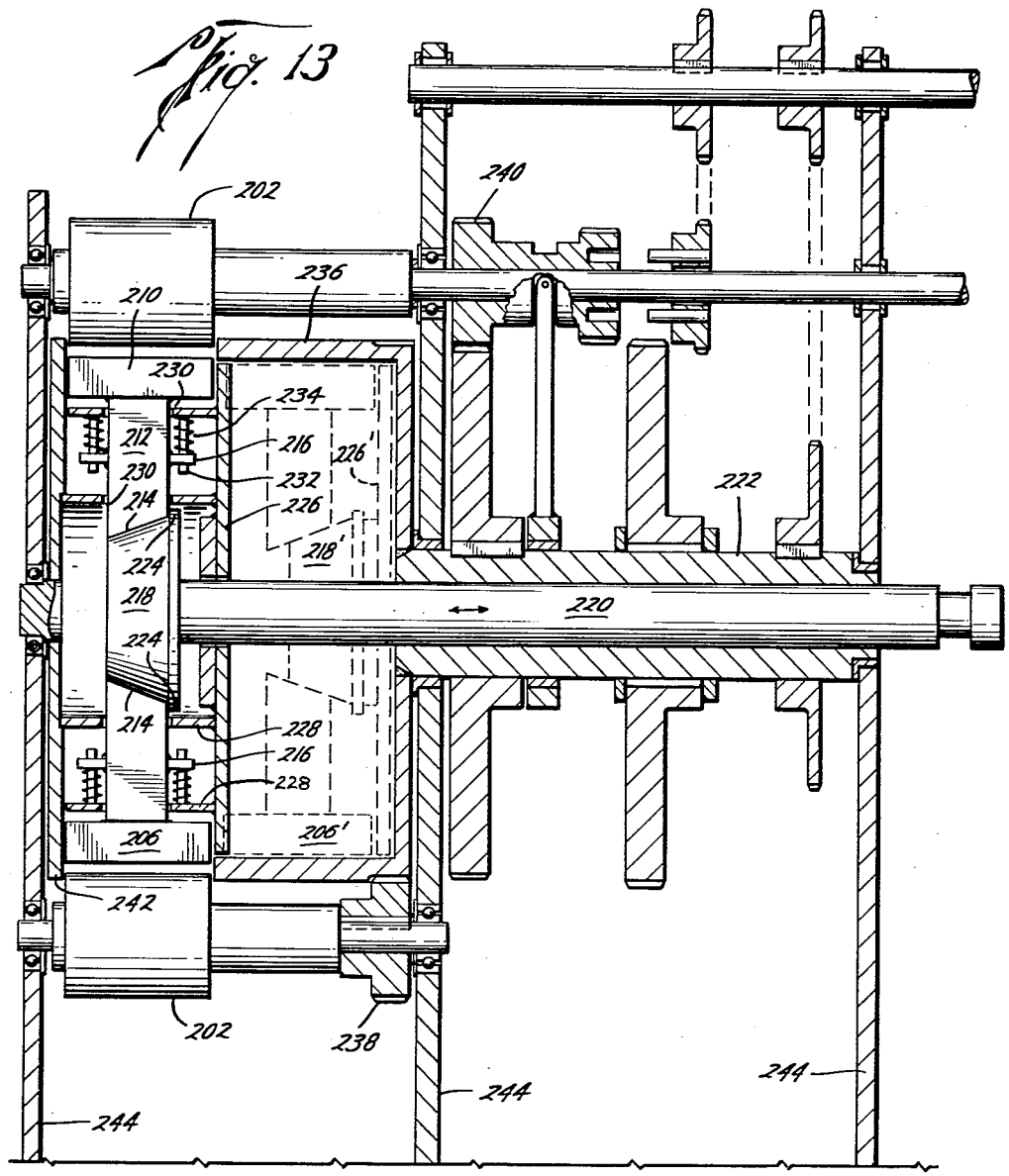

Feb. 25, 1964 S. W. SINCLAIR 3,122,089
ROTARY PRESS AND LINT SAMPLER
Filed May 16, 1961 8 Sheets-Sheet 8
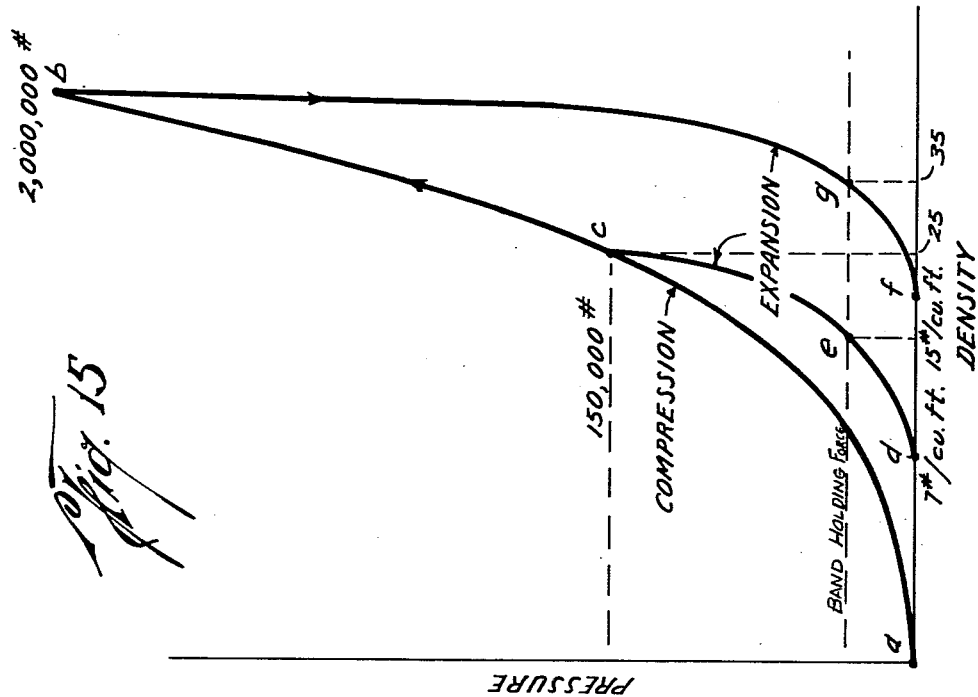
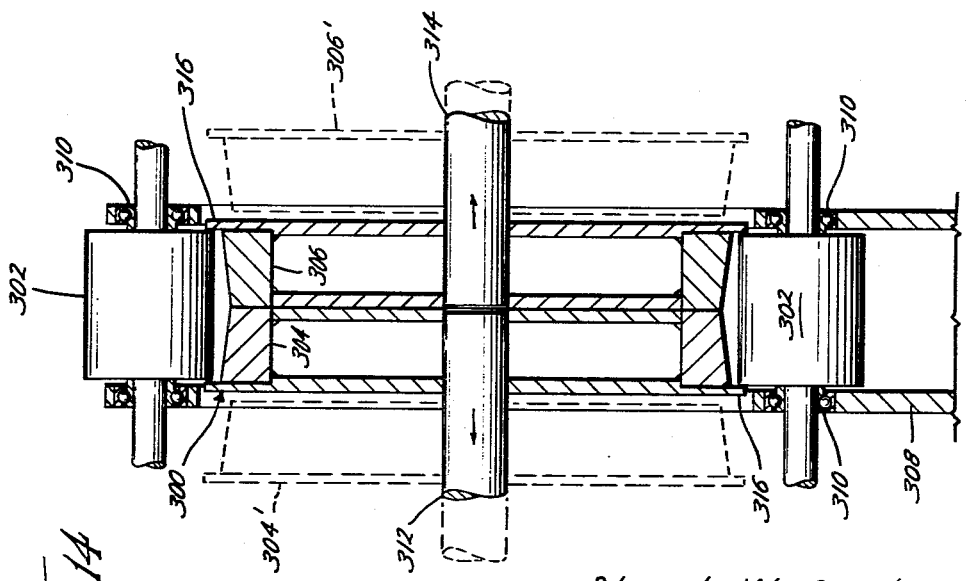
Stuart W. Sinclair
INVENTOR.
BY James F. Weiler
Jefferson D. Giller
William A. Stout
Paul L. DeVerter II
ATTORNEYS United States Patent Office 3,122,089
Patented Feb. 25, 1964

3,122,089
ROTARY PRESS AND LINT SAMPLER
Stuart W. Sinclair, Houston, Tex., assignor to Anderson, Clayton & Co., Houston, Tex., a corporation of Delaware
Filed May 16, 1961, Ser. No. 110,478
9 Claims. (Cl. 100—40)

The present invention relates to an improved rotary press and lint sampler and methods particularly useful in increasing the density of ginned cotton fibers and making a continuous sample of compressed cotton as it is being placed in a conventional press for baling.

Although the present invention is particularly described hereinafter with reference to cotton fibre, it will become apparent that the present invention is useful in increasing the density of any compressible fiber lint and making a continuous sample thereof. The present disclosure is directed, therefore, to a rotary press and sampler for cotton, but it will be understood that other fibers and lints are encompassed within the scope hereof. To understand the theory of the present invention and the state of the cotton press art, a summary is given.

When raw cotton reaches the gin, it is first processed in a cotton gin to remove the seed and a great deal of the trash picked up with the bolls. The cotton fiber output of the cotton gin is typically called lint. The lint is very light, fluffy and loose, hence, for economy of transportation and storage, it is compressed to a higher density, and this compressed mass of cotton lint is called a bale. These bales are somewhat rectangular in shape for they are typically produced on platen presses.

Typically, gins produce either "gin flat" bales or "gin standard" bales, although a very few gins produce a much denser bale called the "gin Hi-D" (gin high density). The gin flat press costs approximately $8,000 at the present time and produces a bale having a density of about 15#/cu. ft. The gin standard press produces a bale having a density of about 20–25#/cu. ft. and costs a great deal more—approximately $25,000 at the present time, even though the bale density has increased only 5–10#/cu. ft. The gin Hi-D press is a massive piece of equipment costing approximately $75,000 at the present time and produces a bale having a density of about 32–35#/cu. ft.

To understand the reason why these various gin presses increase so rapidly in cost, reference is made to FIGURE 15 wherein an approximate pressure-density curve a—b is shown for the compression of cotton. To produce a gin flat bale, the press must exert a pressure of about 150,000#. Thus, following the curve upwardly from a, the press exerts a force of 150,000# at point c, which is equivalent to a density of about 25#/cu. ft. Then, when the press is opened to permit tying of the compressed cotton with bands, the cotton expands along the line c—d. Due to the lay of the lint and the nature of cotton, once it has been killed or compressed, the density remains at some value, such as 7#/cu. ft. (point d) even without bands. However, with bands, the resultant density is about 15#/cu. ft. (point e on line c—d). Hence to produce a gin flat bale of 15#/cu. ft. density, the press must exert a force of 150,000# on an area approximately 28 in. x 55 in. Recompression of previously killed or compressed cotton substantially duplicates the expansion curve c—d up until the original compression curve is reached (point c), and thereafter the cotton follows the original compression curve a—b upwardly.

In a similar manner, to produce a gin standard bale of 20#/cu. ft. density, a total force of about 600,000# must be exerted, and to produce a gin Hi-D bale of 35#/cu. ft. density, a total force of 2–2,500,000# must be exerted. Further, the gin Hi-D press platen has an area of about 20 in. x 54 in. and the press stroke is approximately 8 ft. 6 in. Thus, it is readily seen that the machines are huge, and extremely powerful, and accordingly the price is prohibitive.

Nonetheless, if a quantity of cotton were available, the cost might be justified. Unfortunately, however, gins are typically located in small towns and the geographical area which a gin can economically serve is limited. So, very few gins can afford the gin Hi-D press, even though it produces a more economically shipped and stored bale. Consequently, the majority of gins produce a gin flat bale which is sent to the compress for further densification. At the compress more cotton is available, hence larger equipment is justified.

From the foregoing, it is seen that it would be very advantageous to provide a small press, simply made, relatively inexpensive, which is capable of exerting at least 2,000,000# force on cotton lint in such a manner as will produce a very high density bale. Such a press could then be economically installed at the gin to provide bales for export and domestic use, and the need for the compress would be eliminated, except perhaps at a warehouse. These, then are the general objects of the present invention.

Previously, presses have been suggested and built which produce a round bale or a long cylinder of cotton, by rolling a continuous length of batting. Patented examples showing these round bale presses are: Treese, 653,191; Treese, 980,706; Brown, 1,257,798; Mackenzie, 1,834,466; and Mackenzie, 1,881,774. The round bale so produced was quite effective from the ginners' standpoint, but was unacceptable to the textile mills due to the matted fiber produced in the center of the bale.

The present invention is directed to a rotary press which incorporates a drum about which the cotton lint is wound and compressed. Thereafter, this compressed cotton lint is removed from the drum and placed in a small banding press for the attachment of bands. The resultant bale is rectangular in cross-section, and its density is superior to that of the gin Hi-D bale. The entire rotary press is quite small and the bale produced therefrom is uniform, without matted fibers.

In addition to utilizing the present invention as a rotary press, a smaller version thereof is ideally suited for use as a lint sampler. Cotton is one of the few commodities still purchased by samples. This necessitates hiring expert samplers in each cotton producing area to grade the baled cotton as to quality. It is customary for the sampler to cut the burlap protective cover on each bale and remove a large sample plug of cotton. This plug is then examined and graded, and it is assumed that the plug adequately represents the remainder of the bale. If the once plugged bale is not then sold, it will be left in a warehouse until another potential buyer is found. Again the plugging and grading is repeated, until the bale is sold. By this time, it is not unusual for the price of the bale to decline because of its mangled condition after being repeatedly plugged.

Prior devices to solve this problem have been developed which intermittently remove bursts of cotton lint from the flue between the gin machine and the baling press, condense the lint, tramp it, and finally insert a dozen or so layers into a paper wrapper. These devices were developed by the U.S. Department of Agriculture. Because the cotton is sampled intermittently, the sample does not contain a portion of all of the lint in the bale, nor does a cross-section of the paper-wrapped sample represent a similar cross-section of the bale. Since the price of the bale is determined by the quality of the sample, it is very advantageous to provide a truly representative sample. Such a sample should contain a portion of all of the fiber in the bale, it should be compressed as is the bale, it should have the same fiber lay, and the bale should not be disturbed when grading the sample. The lint sampler of the present invention meets all of these requirements, and is additionally small, simple, easily repaired, and requires very little control equipment. Further, the lint sampler utilizes a smaller sample valve in the lint flue which opens only once.

The lint sampler of the present invention is directed to a rotary press which incorporates a drum about which the cotton lint is wound and compressed. Thereafter, the compressed cotton lint is removed from the drum and placed in a sample bag or paper wrapper. The lint sampler gathers and compresses cotton fiber virtually the entire time that the corresponding bale is being formed either on a rotary press or conventional platen press.

It is, therefore, an object of the present invention to provide a rotary press and lint sampler which has all of the advantages hereinbefore mentioned and overcomes the disadvantages of the prior devices.

Another object of the present invention is to provide a small press capable of exerting 2,000,000# force on cotton lint in such a manner as will produce a very high density bale with unmatted fibers.

Yet another object of the present invention is to provide a rotary press having a drum which produces a circular band of compressed fiber.

Another object is to provide a rotary press having a drum from which compressed fiber may be easily and readily removed, and converted into elongate batts for the formation of a rectangular cross-section bale or for insertion into a sample wrapper.

A still further object of the present invention is to provide a novel means for the removal of a compressed ring of fiber from the drum of a rotary press.

Another object of the present invention is to provide a rotary press whereby the pressure necessary to form a highly compressed fiber batt need be applied to only a small part of the fiber at any one time, thus substantially reducing the total force, size, and complexity of the press.

Another object of the present invention is to provide a fiber press which requires no surges of energy and which employs a mechanical drive with components familiar to ginners and without the need for fluid pressures and attendant oil stains.

Another object of the present invention is to provide a method of compressing a batt of fiber which is unmatted and very dense.

Still another object of the present invention is to provide a method of compressing a batt which includes winding the batt upon a drum and compressing the batt between the drum and a series of compression rollers disposed about the drum.

Yet another object of the present invention is to provide a method of compressing a loose fibrous batt which includes winding the batt upon a drum, compressing the batt between the drum and a series of compression rollers disposed about the drum and ejecting the compressed batt for insertion in a sack or wrapper as a sample or for placement on a small banding press for banding several compressed batts into a bale.

Other and further objects, features and advantages will be apparent from the following description of presently preferred embodiments of the invention, given for the purpose of disclosure, taken in conjunction with the accompanying drawings, where like character references designate like parts throughout the several views, and where:

FIGURE 1 is a schematic representation of the flow of cotton in a gin, showing the present invention utilized as a lint sampler, FIGURE 2 is a schematic representation of one form of ejection mechanism for compressed batts of the present invention, FIGURE 3 is a view similar to FIGURE 2 showing the compressed ring-like batt being cut, FIGURE 4 is a view similar to FIGURE 2 showing the batt being ejected, FIGURE 5 is a rear view of a lint sampler according to the present invention, FIGURE 6 is a side view of the device of FIGURE 5, FIGURE 7 is a front view of the device of FIGURE 5, FIGURE 8 is a schematic representation of one form of drive for the compression rollers of the device of FIGURE 5, FIGURE 9 is a partial sectional end view of a segmented drum and compression rollers of one form of the invention, FIGURE 10 is a schematic representation of the device of FIGURE 9 showing the introduction of cotton fiber thereto, FIGURE 11 is a view similar to FIGURE 10 showing the segmented drum retracted, FIGURE 12 is a view similar to FIGURE 10 showing the ejection of a compressed batt, FIGURE 13 is a partial sectional side view of the rotary press of FIGURE 9 showing in dotted lines the retracted position of the drum, FIGURE 14 is a partial sectional side view of another form of drum for the rotary press of the present invention, and FIGURE 15 is a pressure density curve of cotton fiber showing the effect of compression and expansion.

Generally, the apparatus of the invention comprises a drum whose circumference is surrounded by a series of compression rollers. In addition, means are provided for the ejection of a ring-like batt of compressed fiber, such as by cutting the ring or removing the drum, and then running the batt out.

The theory of the invention is quite readily seen by referring to FIGURE 15, and the prior discussion thereof hereinabove. Briefly, cotton fiber when compressed follows the curve $a-b$ upwardly. This curve is derived from data obtained when compressing bales of cotton in hydraulic presses. As previously noted, if the cotton fiber is compressed until a certain pressure is reached, such as at $c$, and then the pressure is removed, the cotton gradually expands along the line $c-d$. Therefore, the density has increased even though the pressure is removed, for the density at $d$ is greater than that at $a$. Further, if the once compressed fiber is recompressed it substantially follows the curve $d-c$ until intersecting the original curve $a-b$, hence the recompression curve would be $d-c-b$. A similar family of expansion and recompression curves exists all along the curve $a-b$.

If the cotton fiber is compressed along $a-b$ to $c$, then removed from the press, it expands down to $d$. Thereupon, the compressed fiber (now a batt) is placed in a small press for banding and a comparatively small amount of pressure again applied (such as that indicated by the horizontal dashed line labeled "band holding force") and the density is again increased to that at point $e$. This may be conveniently done in a small conventional banding platen press.

Thus it is seen that the problem is to effect a substantial first compression along the curve $a-b$, with much smaller equipment than heretofore used. Therefore, the present invention applies a very high pressure to a small area of the cotton fiber by wrapping the cotton lint about a drum and compressing the lint between the drum and a series of rollers disposed about the drum. Thereupon, means are provided for the removal of the compressed ring of cotton from the rotary press. The discussion which follows is first directed to a lint sampler for compressing and packaging a sample of cotton lint which may be used for grading a contemporaneously formed bale.

Then the discussion will turn to additional forms of the rotary press for particular use in bale forming instead of sampling, although all may be used interchangeably.

Referring now to FIGURE 1, a generalized schematic view of the flow of cotton lint in a gin is shown. The trash is removed and the incoming cotton bolls are then deseeded in the conventional gin machine 20. Then the cotton is conducted to the conventional gin press 22 through a lint flue or conduit 24. The lint may be carried by a positive pressure (such as by blowers) or by a vacuum system, both of which are conventional, and a condenser 26 is used to remove the air and leave an uncompressed mat of fiber. This mat is built up in layers in a conventional gin press 22, and then compressed into a bale.

A sample valve 28 is provided in the flue 24 for the removal of a sample of cotton lint which will be made into a packaged compressed sample. A conventional sample valve 28 is shown in the patent to Gaus et al., No. 2,320,544. Leading from the valve 28 is a duct 30, which may be a flexible hose, that carries a small part of the airborne lint 32 to the lint sampler 34. The lint sampler 34 includes condenser rollers 36, guide rollers 38 immediately downstream from the condenser rollers 36, and a drum 40 surrounded by compression rollers 42. Associated with the drum 40 is a means of removing the compressed batt, hereinafter described. The cotton batt 44 leaving the condenser rollers 36 is shown as a mat defined by two solid lines for ease of explanation.

The condenser rollers 36 turn inwardly toward each other, as indicated by the arrows, and remove the air which carries the lint 32. In a conventional manner, therefore, the condenser rollers 36 provide a loose batt 44 of cotton fiber which is fed to the guide rollers 38. The guide rollers 38 also rotate inwardly to provide a slight firming up or compression of the batt 44 and also to feed the batt 44 onto the drum 40. The drum 40 rotates in a certain direction, such as that indicated by the arrow, and likewise the compression rollers 42 rotate with substantially the same peripheral speed as the drum 40, so that the batt 44 is fed and wound about the drum 40. The compression rollers 42 are spaced from the periphery of the drum 40 a small distance to allow the batt 44 to pass therebetween. In a conventional manner, some or all of the compression rollers 42 may be knurled, toothed, splined, or the like to aid in winding the batt 44 upon the drum 40. In a spiral manner, the successive layers of the batt 44 are built up on the drum 40. As the thickness of the wound batt 44 increases, the compression rollers 42 begin to compress the batt 44.

The compression of the wound batt 44 continues until either the gin press 22 is full and the lint in the lint flue 24 is shut off upstream from the valve 28, or until the lint sampler 34 is shut down due to reaching its capacity, or until the lint from the gin machine 20 is diverted through appropriate conventional means to a similar gin press 22 and lint sampler 34 or a conventional accumulator (not shown). In any event, as a mere matter of design, the capacity of the lint sampler 34 is designed so that the compression on the batt 44 is substantially equivalent to that of a normal bale being formed in the gin press 22, and this desired compression is designed to be reached at approximately the same time as the condenser 26 for the gin press 22 is shut down. Therefore, advantageously, the valve 28 is opened only once and remains open thereafter substantially the entire time the bale is being formed in the gin press 22. It is readily seen, therefore, that the batt 44 compressed by the lint sampler 34 contains a sample portion of virtually all of the cotton in the bale, and also provides a batt 44 which is compressed in layers just as the bale. Further, the lay is similar to the bale and unmatted, for compression occurs in only one direction.

Referring again to FIGURE 15, it is seen that the pressure needed to form a high density bale increases rapidly. The pressure is, of course, defined as the force divided by the area. Therefore, in a conventional platen press if it is necessary to produce 2–2,500,000# force on a platen area of 20 in. x 54 in. to form a gin Hi-D bale, the resultant pressure needed is roughly 300,000 pounds per square foot (p.s.f.). Now, if the area of compression is substantially reduced and the resultant pressure needed remains the same, i.e., roughly 300,000 p.s.f., then the necessary force is likewise substantially reduced. Thus, if the area of compression is reduced to 20 in. x ¼ in., the necessary force is reduced to roughly 10,000#, and the resultant pressure remains 300,000 p.s.f. In this manner, a substantial reduction in force has occurred, and the size of the press may be accordingly reduced.

As shown in FIGURE 1, the compression rollers 42 surround the drum 40. The batt 44 being compressed is disposed therebetween. The theoretical area being compressed is only the line of contact between the compression roller 42 and drum 40, and this line is as long as the roller 42 with no appreciable width. The actual area, however, is the length of the roller 42 and a finite width, and it is obvious that the highest pressure is exerted on the batt 44 at its intersection with a plane through the centers of the drum 40 and roller 42. In any event, the force necessary to compress the batt is reduced.

When the lint 32 coming from the valve 28 is shut off, the batt 44 is immediately wound and compressed around the drum 40, and becomes a ring of compressed cotton fiber. This ring must then be removed from the drum 40 and converted into an elongate batt for insertion in a wrapper. Referring now to FIGURES 2–4, one means for doing so is shown. Briefly, this means comprises cutting the ring and running the batt 44 off of the drum.

One sector of the circumference of the drum 40 is composed of a cutter 46 having the same width as the drum 40. The cutter 46 is pivoted about the axis 48, and includes two cylindrical surfaces 50 and 52. Surface 50 has the same radius as the drum 40 so that when this surface 50 is exposed, the perimeter of the drum 40 defines a circle, such as shown in FIGURE 2. Surface 52, however, is designed to bulge outwardly when exposed on the drum 40, as in FIGURE 3, so that the spacing between the compression roller 42 and the exposed surface 52 is less than that between the drum 40 and compression roller 42. Pivotably attached to the cutter 46 is a connecting link 54 and pivotably attached to the link 54 is a crank 56. The crank 56 may be rotated through the axis of the drum 40.

To cut the batt 44 and remove it from the lint sampler 34, the rotation of the drum 40 and compression rollers 42 is stopped, with the cutter 46 opposite compression roller 42a. Thereupon, one of the compression rollers 42b is pivoted outwardly from the drum 40. Then the rotation of the compression rollers 42a and 42b is reversed. At the same time, the crank 56 is rotated to move the link 54 which rotates the cutter 46 about the axis 48. In this manner, the surface 50 is withdrawn into the drum 40 and the bulging surface 52 is exposed. Compare FIGURES 2 and 3. Since compression roller 42a is the only rotating roller now contacting the batt 44, and since the spacing between the roller 42a and the cutter 46 is reduced, the rotating roller 42a tears or cuts the batt 44 along the width of the drum 40, as shown in FIGURE 3.

Roller 42a continues to rotate, and begins to rotate the drum 40 through the batt 44. After a slight rotation of the drum 40, the crank 56 is again rotated to retract the bulging surface 52 and re-expose surface 50, thereby making the surface of the drum 40 a circular cylinder again, as shown in FIGURE 4. The compression roller 42c immediately below the pivoted roller 42b is now rotated in a direction opposite to that of rollers 42a and 42b, so that the leading edge of the batt 44 is ejected outwardly between roller 42b and roller 41c, as seen in FIGURE 4. After one revolution of the drum 40, the batt 44 is completely ejected.

Thereupon, the ejected batt 44 is led through appropriate discharge rollers 58 (seen in FIGURE 7) and into a rectangular wrapper or sack 60. In a few seconds, the discharged cotton batt 44 begins to expand and fills the sack 60. The sack 60 is then removed from the lint sampler 34, and the operation is complete. A sample batt has been made which contains a portion of virtually all of the lint which makes up the bale, the sample has been compressed in layers, the fiber lay resembles the bale and is unmatted, and the equipment utilized is relatively simple.

Now that the theory of operation and generalized schematics have been presented, an embodiment of the lint sampler 34 of the present invention will be discussed. A presently preferred embodiment is shown in FIGURES 5–7. Referring now to FIGURE 5, the lint sampler 34 generally includes a frame 62 on which are rotatably mounted the condenser roller pulleys 136 which are directly connected to the condenser rollers 36, the guide roller pulleys 138 which are directly connected to the guide rollers 38, the drum pulley 140 which is connected to the drum 40, and the compression roller gears 142 which are connected to the compression rollers 42, all in a conventional manner. The condenser roller pulleys 136, guide roller pulleys 138, idler 64, adjustable idler 66, and a pulley 68 (shown in FIGURE 8) are interconnected by a belt 70, in such a manner that the pulleys will rotate in the direction shown by the arrows when feeding a batt to the drum. The adjustable idler 66 is rotatably mounted on a plate 72 which is pivotably mounted at 74 on the frame 62. The plate 72 includes an arcuate slot 76 through which a bolt 78 is attached to the frame 62. When the bolt 78 is loosened, the plate 72 may be pivoted to tighten the belt 70.

A pulley 80 is attached to the jack shaft 82 and connected by a belt 84 to a motor 86. The jack shaft 82 in turn moves the belt 88 to rotate the drum pulley 140, and therefore the drum 40. Shown in FIGURE 7 is an appropriate drum gear 92 connected to the drum pulley 140 to drive the compression roller gears 142 and therefore the compression rollers 42. An identical drum gear 92 is shown in FIGURE 7. Surrounding the upper part of the condenser rollers 36, which cannot be seen in FIGURE 5 because of the condenser roller pulleys 136, is a seal 90 which is typically used in positive pressure type condensers. A similar seal 90 and the condenser rollers 36 are clearly shown in FIGURES 6 and 7.

Referring now to FIGURE 7, the front of the lint sampler 34 is shown. The drum gear 92 engages the compression roller gears 142. Since the compression rollers 42 are closely spaced, as previously shown in FIGURE 1, alternate compression rollers 42 are driven from opposite sides, although they may be driven from the same side (Treese 653,191, supra). Mounted on the upper part of the frame 62 are the condenser rollers 36, and immediately below them are the guide rollers 38, shown in dotted lines. The motor 26 is also shown in dotted lines, as are the discharge rollers 58.

Pivotably mounted on the frame 62 is a lever 94 to which are attached eccentric cams 96 and crank 98. The cams 96 are utilized to clamp the sack 60 to the lint sampler 34 by actuating two clamps 100, here shown as angle irons. Referring now to FIGURES 5 and 6, the clamps 100 are clearly shown. The clamps 100 are pivoted to the frame 62 at points 102. When the lever 94 is pulled, it rotates in the frame 62 and turns each cam 96. The cams 96 in turn pivot the clamps 100 about the pivot points 102. In this manner, the clamps 100 are moved toward or away from a funnel or chute 104 beneath the discharge rollers 58. The sack 60 is fitted about the funnel 104 and held thereon when the lever 94 is actuated to move the clamps 100 against the top of the sack 60 and the funnel 104. The funnel 104 is best seen in FIGURE 8.

The lever 94 is also actuates the previously discussed cutter 46. The crank 98 is pivotably attached to the link 106 (see particularly FIGURE 7), which is in turn attached to the disk 108. The disk 108 through an appropriate clutch (not shown) is operatively connected to the crank 56, previously discussed with reference to FIGURES 2 and 3. Therefore, pulling the lever 94 also rotates the crank 98 which moves the link 106 to rotate the disk 108. Rotation of the disk 108 thereupon actuates the crank 56 and link 54, to pivot the cutter 46, thereby exposing the bulging cutter surface 52.

Still a third function is performed by the lever 94. When the sack 60 is attached, and the cutter 46 rotated for the cutting operation, then the compression roller 42b is pivoted outwardly from the drum 40. Particular reference is now made to FIGURE 8, wherein the lever 94 and part of the gearing and pulleys for the drum 40, compression rollers 42, guide rollers 38, and discharge rollers 58 are shown. Thus the compression rollers 42 are immediately attached to the compression roller gears 142, the discharge rollers 58 to the discharge roller gears 158, and the like. Keyed to the lever 94 is a crank 110, which is pivotably attached to the link 112, which in turn is pivotably attached to the bell crank 114 which is pivotably attached to the link 116, which is in turn pivotably attached to the compression roller 42b. The compression roller 42b and its gear 142b are pivotably attached to the compression roller 42a and its gear 142a, as by the link 118. Therefore, pulling the lever 94 results in pivoting the compression roller 42b and its gear 142b, as shown by the pivoted position in dotted lines in FIGURE 8 and the addition of prime marks. Thus, pulling lever 94 rotates crank 110 to 110′, moves link 112 to 112′, rotates bell crank 114 to 114′, pulls out link 116 to 116′, and therefore pivots gear 142b to 142b′ away from the drum.

Finally, movement of the lever 94 may also reverse the motor 86 or associated gearing to change the direction of rotation of the drum 40 from compression to ejection of the batt 44. Likewise, it is obvious that each of the functions of the lever 94 may be performed by separate levers or other means within the skill of the art.

From the foregoing, it is felt that the operation of the present invention as a lint sampler 34 is apparent. Briefly, then, the valve 28 is opened to admit airborne lint 32 to the condenser rollers 36 which remove the air and form a loose batt 44. This batt 44 is firmed and guided to the drum 40 by the guide rollers 38. Thereupon, the batt 44 is compressed about the drum 40 by the compression rollers 42. When the main bale is finished, the valve 28 is closed and the remainder of the batt 44 quickly wound and compressed. Thereupon the motor 86 is stopped and the lever 94 pulled. This pivots the compression roller 42b away from the drum 40; exposes the surface 52 of the cutter 46 to the action compression roller 42a; and clamps the sack 60 to the funnel 104. Then, through appropriate gearing, the rotation of the roller 42a begins in the opposite direction and cuts the batt 44. The surface 52 of the cutter 46 is withdrawn and replaced again with surface 50. The compression roller 42c begins to turn in a direction opposite to the drum 40 rotation and leads the cut batt 44 to the discharge rollers 58. The discharge rollers guide the compressed batt 44 into the sack 60. Thereafter, a return of the lever 94 to its original position releases the sack 60 with the compressed sample therein, and prepares the lint sampler 34 for another cycle.

Obviously more or less compression rollers may be utilized than those shown, and the width of the drum increased or decreased as needed, all being within the skill of the art. Likewise, the motor need not be mounted on the frame, nor need it be a motor at all, for the lint sampler may be actuated by an existing jackshaft in the cotton gin.

When it is desired to utilize the present invention as a rotary press for the production of full size bales, it is readily apparent that the type of drum previously discussed is quite adaptable therefor. In this instance, the rotary press would replace the large gin press 22 shown schematically in FIGURE 1. The rotary press would make a large number of compressed batts which would thereupon be stacked together on the platen of a small banding press. The banding press need not be a powerful machine, for reasons that will be apparent from another look at FIGURE 15. When the rotary press compresses the cotton along the curve from $a$ to $b$, and then ejects the compressed batts, they will expand downwardly along the curve $b-f$. However, the cotton batts, even at point $f$, retain a considerable density, in the nature of 25#/cu. ft. Thereafter, to recompress the once compressed batts, the banding press need only exert the small force represented by the horizontal dashed line (point $g$) to provide a bale having a density of approximately 35#/cu. ft. In this manner, a small banding press and the rotary press of the present invention have completely replaced the huge 8'6" stroke gin Hi-D platen press. The banding press will represent no additional outlay to the ginner, for such small presses are also utilized to band bales made by conventional gin platen presses.

Other configurations are contemplated for the drum and cutter previously discussed. It is quite feasible to produce batts in the rotary press of the present invention without the need for cutting the ring-like batt. Drums for this purpose will now be discussed. Referring to FIGURE 1, it is seen that if the drum is withdrawn from the cluster of compression rollers, the compressed batt may be ejected without cutting by contacting the inner surface of the ring-like batt with itself. See FIGURE 12 which is hereinafter discussed. The double-over batt thus formed as a length of ½ the circumference of the drum, instead of the batt previously produced by the lint sampler 34 which has a length approximately the circumference of the drum. Therefore, if the traditional length of the bale is to remain at approximately 54 inches, the double-over batt producing rotary press will have a drum diameter of roughly 32 inches, making the rotary press of the present invention quite small.

Reference is now made to FIGURES 9–13 which show the segmented drum 200 of the present invention and its operation. Surrounding the drum 200 are compression rollers 202 and below the drum 200 are discharge rollers 204, which in general are very similar to the previously discussed compression rollers 42 and discharge rollers 56. Generally, the drum 200 comprises a series of retractable segments 206 which may be locked in place to form a circular drum on which a batt 208 of cotton fiber is wound and compressed by the compression rollers 202, and thereupon the segments 206 may be unlocked, and withdrawn from the cluster of compression rollers 202 for the ejection of the batt 208.

Referring now to FIGURE 10, a schematic representation of the segmented drum 200 is shown, surrounded by a cluster of compression rollers 202, with the batt 208 being wound and compressed on the drum 200. Rotation is indicated by the arrows. The segments 206 are shown locked to form the drum 200.

After the appropriate condenser (such as that previously shown as 26) has ceased to supply more batt 208, further rotation of the drum 200 produces a ring-like compressed batt 208. Rotation of the drum 200 and rollers 202 is stopped. Thereupon, referring now to FIGURE 11, the individual segments 206 of the drum 200 are moved inwardly toward the center of the drum 200 and then moved along the axis of the drum 200, so that the drum 200 is no longer within the cluster of compression rollers 202, all in a manner to be hereinafter described. Now, the batt 208 is unsupported in its center.

Referring now to FIGURE 12, the compression rollers 202 are again rotated to eject the compressed batt 208. The ejection is accomplished by rotating the rollers 202 inwardly and downwardly, that is the rollers 202 on the left-hand side rotate clockwise and those on the right counterclockwise, as shown by the arrows. The batt 208, therefore, is pulled between the lowermost inwardly rotating compression rollers 202, doubled over, and ejected downwardly between the discharge rollers 204. As mentioned with regard to the compression rollers 42, these compression rollers 202 may be knurled, toothed, splined, or the like.

When the segmented drum 200 type rotary press is used as a sampler, the batt 208 may be placed, as before, in a sack. And, when used as a rotary press, the batts are stacked on a small banding press for tying in a conventional manner.

Thus, a compressed batt 208 may be quickly fabricated and ejected, for the formation of a high density bale. And the equipment utilized is simple and durable, with only simple mechanical power being required.

Now that the operation of a segmented drum has been presented, reference is made to FIGURES 9 and 13 for a specific embodiment thereof. Each of the segments 206 includes a head 210 whose outer surface is curved, so that all of the segments 206 together form a circle, as seen in FIGURE 9. On the back side of the heads 210, stems 212 are conventionally attached, and the innermost ends of the stems 212 are tapered, as shown at 214 in FIGURE 13. Attached to the stems 212 are lugs 216.

In the center of the drum 200 is a tapered hub 218 which is attached to a shaft 220 that is suitably journaled in a concentric shaft 222. The taper of the hub 218 is the same as that of the tapered end 214 of the stem 212. At the large end of the tapered hub 218 is a shoulder 224.

Slidably mounted on the shaft 220 is a disk 226 to which are attached suitable guide rings 228. The guide rings 228 include openings 230 arranged in a radial pattern for the insertion of the stems 212 of the segments 206. Dowels 232 are attached to the outermost ring 228 and these dowels 232 slidably extend through the lugs 216 on the stems 212. Mounted on the dowels 232 are springs 234 which yieldably urge the lugs 216, stems 212, heads 210, and therefore the segments 206 radially inwardly. Thus the tapered ends 214 of the stems 212 are urged toward the tapered hub 218.

Immediately behind the drum 200 is a cup 236 which is attached to the concentric shaft 222. The outer diameter of the cup 236 is slightly larger than the diameter of the drum 200 when in a locked position as shown in FIGURE 13, and the inner diameter of the cup 236 is slightly larger than the diameter of the drum 200 when in an unlocked position as shown in the dotted lines in FIGURE 13, for a purpose which will become apparent.

About the drum 200 when in a locked position are a cluster of compression rollers 202. Conventionally attached to the compression rollers 202 are gears such as 238 and 240 whereby the compression rollers 202 may be rotated in the same direction for compression and half of them in the opposite direction for ejection, as mentioned above. Adjacent the drum 200 and opposite the cup 236 is a plate 242 which is rotatably attached to the frame 244, and which has a diameter slightly larger than the drum 200 in a locked position, as does the cup 236. The compression rollers 202 and concentric shaft 222 are also journaled in the frame 244, in a conventional manner.

The drum 200 is moved from a locked position to a retracted unlocked position by transverse or axial movement of the shaft 220. Thus, in the locked position, shown in FIGURE 13, the shaft is urged to the left, whereupon the tapered hub 218 bears against the tapered ends 214 of the stems 212, overcomes the springs 234, and thus radially pushes the segments 206 outwardly to form the drum 200. The shoulder 224 on the tapered hub 218 engages the side of the stem 212 to prevent further movement, and the drum 200 is in a locked position. The space left between the compression rollers 202 and head 210 of the segments 206, and bounded on the sides by the plate 242 and the cup 236, is utilized to compress the batt 208 of cotton fiber. As the drum 200, compression rollers 202, plate 242 and cup are all rotatable, the batt 208 being compressed will not snag.

To unlock and retract the drum 200 so that the compressed batt 208 may be ejected, the shaft 220 is moved to the right. The tapered hub 218 engages the disk 226 and moves it back into the cup 236. The final position of the disk 226 when unlocked is shown in dotted lines 226' in FIGURE 13. Likewise, the unlocked position of the tapered hub 218 is shown in dotted lines as 218'. As the hub 218 moves to the unlocked position 218', the tapered ends 214 of the stems 212 are urged radially inwardly by the springs 234 and slide along the tapered hub 218. Thus, the diameter of the segmented drum 200 is reduced to less than the inner diameter of the cup 236. When the hub 218 engages the disk 226 and begins to move the disk 226 to its unlocked position 226', the guide rings 228 engage the stems 212 and thereby move the segments 206 to the unlocked position 206'. In this manner the entire segmented drum 200 is reduced in diameter and moved axially into the cup 236, thereby leaving the batt 208 intact and unsupported, as shown in FIGURE 11. Thereafter, appropriate rotation of the compression rollers 202 will quickly eject the compressed batt 208.

The operation and use of the segmented drum 200 is believed to be apparent. Briefly, in summary, the segmented drum is locked by axially moving the hub 218 to the left, whereupon the tapered ends 214 of the stems 212 are moved radially outwardly by the tapered hub 218. This outward movement continues until the shoulder 224 of the hub 218 engages the sides of the stems 212, thereby locking the segmented drum 200. Rotation of the compression rollers 202 and drum 200 is commenced, and the batt 208 is wound and compressed upon the drum 200. When the desired thickness and compression of the batt 208 has been attained, the rotation is ceased. Thereupon the segmented drum 200 is removed from the cluster of compression rollers 202, by axial movement of the shaft 220. Thereupon, the stems 212 and thus the segments 206 move radially inwardly along the tapered hub 218, thus reducing the diameter of the drum 200. Then the disk 226 is engaged by the hub 218 and moved axially to 226', pulling the segments 206 along to 206' by the action of the guide rings 228 on the stems 212. The unsupported batt 208 is quickly ejected without cutting by the inward and downward rotation of the compression rollers 202 and through the discharge rollers 204. The compressed batt 208 is thereafter sacked as a sample, or laid on a stack of similar batts for banding into a bale. Another batt is quickly fabricated by again locking the drum 200 and repeating the cycle.

Yet another form of drum is contemplated which will produce highly compressed batts of cotton, either for sampling or bale formation. This drum is likewise removable from the cluster of compression rollers and produces an uncut batt similar to that produced by drum 200 above. As the theory of production of a compressed batt and the operation of the compression rollers have previously been presented, only a single view of this modification is presented, FIGURE 14, for its general structure will be apparent from the preceding discussion.

Generally, this modification of the invention comprises a drum 300 which is surrounded by a cluster of compression rollers 302. The drum 300 is split, however, into two flanged wheels 304 and 306. When the wheels 304 and 306 are butted together a drum is formed, about which is wound and compressed a batt as before. To remove the compressed batt, the wheels 304 and 306 are moved axially apart, and the compressed batt ejected as was the batt 208 in FIGURE 12.

Referring now to FIGURE 14, on the frame 308 in suitable bearings 310 are mounted a series or cluster of compression rollers 302. Within the cluster of compression rollers is a split drum 300. The drum 300 includes wheels 304 and 306. The wheels 304 and 306 are mounted on shafts 312 and 314 which are suitably journaled for rotational and axial movement. The wheels 304 and 306 include flanges 316 and may be tapered, as shown. When butted together as shown in FIGURE 14, the wheels 304 and 306 form the drum 300. When the shafts 312 and 314 are pulled apart, in the directions shown by the arrows, the wheels are moved outwardly to the positions shown in dotted lines as 304' and 306'. In the positions 304' and 306', of course, the compressed batt is unsupported and may be quickly ejected.

In use, the split drum 300 is formed by butting the wheels 304 and 306 together. Thereupon, the cotton batt is wound about the drum 300 and compressed by the compression rollers 302. The compression area is bounded by the wheels 304 and 306, the flanges 316, and the compression rollers 302. After compression is complete, the rotation of the drum 300 and rollers 302 is stopped. To remove the ring-like batt formed, the shafts 312 and 314 are moved axially apart, thereby moving the wheels 304 and 306 to positions 304' and 306'. The taper of the wheels 304 and 306 will permit the wheels to be easily withdrawn from the compressed batt. Thereupon, the compressed batt is quickly ejected by the opposite rotation of the compression rollers 302, just as was previously discussed with reference to the segmented drum 200.

Of course, the segmented drum 200 or the split drum 300 may be substituted for the drum 40 for use as a lint sampler with attendant minor changes well within the skill of the art. Similarly, any of the various drums may be utilized to produce compressed batts for stacking and banding into bales. Likewise, it is contemplated that additional drum configurations, either retractable or not, will be found suitable for the compression of cotton batts.

Thus it is seen that the present invention provides a simple, yet effective, means for the formation of highly compressed cotton batts which may be utilized for the formation of bales or as a lint sampler.

As the theory of operation has been previously disclosed, the method of the present invention is believed to be apparent. As mentioned, any of the apparatus embodiments may be utilized and the method is not intended to be limited to these shown. Briefly, the method of the present invention includes the condensation of airborne lint into a loose fibrous batt. Thereupon, the batt is wound upon a suitable drum and compressed between the drum and a series of compression rollers disposed about the drum. The compressed batt is quite dense, for the reasons previously given with reference to FIGURE 15. The compressed batt is then ejected from between the drum and compression rollers, either by cutting the batt or retracting the drum, and led into a wrapper or sack for use as a sample, or placed on a small banding press with similar compressed batts for the formation of a banded bale.

The present invention, therefore, is well adapted to carry out the objects and attain the ends and advantages mentioned as well as others inherent therein. While presently preferred embodiments of the invention have been given for the purpose of disclosure, numerous changes in the details of construction, and the combination, shape, size, arrangement of parts, and uses may be resorted to without departing from the spirit and scope of the invention as hereinafter claimed.

What is claimed is:

1. In a batt compressing rotary press, a rotatable nonadhesive batt winding drum, a series of rotatable compression rollers surrounding and spaced in fixed relationship from the periphery of said drum, means for rotating said drum and rollers in the same surface direction with respect to the batt at substantially the same peripheral speed to wind and compress said batt upon said drum between said drum and said compression rollers, means for withdrawing said drum from amongst said compression rollers, and means for rotating said compression rollers to eject said compressed batt from said rotary press.

2. In a batt compressing rotary press, a rotatable non-adhesive batt winding drum, said drum comprising segments movable radially inwardly, said drum movable axially when said segments are moved radially inwardly, means for moving and locking said drum to a first position wherein said segments are locked radially outwardly and means for moving said drum axially and said segments radially inwardly to a second position, a series of rotatable compression rollers surrounding and spaced in fixed relationship from the periphery of said drum when in said first position, and means for rotating said drum and rollers in the same surface direction with respect to the batt at substantially the same peripheral speed.

3. The invention of claim 2 including means for forming a loose batt and introducing it between one of said compression rollers and said drum, whereby said batt is wound upon said drum and compressed between said drum and said compression rollers, and means for rotating said compression rollers when said drum is in said second position to eject said compressed batt from said rotary press.

4. The invention of claim 3 wherein said forming and introducing means includes a condenser and rotatable guide rollers disposed adjacent said drum when in said first position.

5. In a batt compressing rotary press, a pair of rotatable and symmetrical axially movable non-adhesive wheels, said wheels when butted together forming a batt winding drum, a series of rotatable compression rollers surrounding and spaced in fixed relationship from the periphery of said drum, means for rotating said drum and rollers in the same surface direction with respect to the batt at substantially the same peripheral speed, means for moving said wheels axially apart and without said series of compression rollers, and means to rotate half of said compression rollers in a rotary direction opposite to that of the remaining compression rollers.

6. The invention of claim 5 wherein said wheels include flanges.

7. The invention of claim 6 wherein said flanged wheels are tapered.

8. The invention of claim 7 including means for forming and introducing a loose batt between one of said rollers and said drum, and discharge rollers disposed beneath said drum, whereby said batt is wound upon said drum and compressed between said drum and said compression rollers and said wheels moved axially apart and said compression rollers rotated to eject said compressed batt between said discharge rollers for ejection from said rotary press.

9. In a method of compressing a loose fibrous batt, winding said batt upon a drum while maintaining a non-adhesive relationship therebetween, compressing said wound batt between said drum and a series of compression rollers surrounding and spaced in fixed relationship from said drum, withdrawing said drum from within the said compression rollers while maintaining said batt within the said surrounding compression rollers, and rotating said compression rollers to eject said compressed batt as a continuous loop.

References Cited in the file of this patent

UNITED STATES PATENTS

| | | |
|---|---|---|
| 27,830 | Powell | Apr. 10, 1860 |
| 446,128 | Brown | Feb. 10, 1891 |
| 529,967 | Smith et al. | Nov. 27, 1894 |
| 653,191 | Treese | July 3, 1900 |
| 681,928 | Remhart | Sept. 3, 1901 |
| 731,882 | Fordyce | June 23, 1903 |
| 980,706 | Treese | Jan. 3, 1911 |
| 1,257,798 | Brown | Feb. 26, 1918 |
| 1,333,351 | Taft | Mar. 9, 1920 |
| 1,834,466 | Mackenzie | Dec. 1, 1931 |
| 1,881,774 | Mackenzie | Oct. 11, 1932 |
| 1,988,692 | Lanter | Jan. 22, 1935 |
| 2,313,102 | Taylor | Mar. 9, 1943 |
| 2,320,544 | Gaus et al. | June 1, 1943 |